STORAGE-PATTERN INDICATING AND DECODING SYSTEM

Filed July 20, 1964 2 Sheets-Sheet 1

INVENTORS.
ERWIN A. HAUCK
JAMES E. WOLLUM
BY
Christie, Parker & Hale
ATTORNEYS.

480 CHARACTER SEGMENT
500 SEG. / DISK
2 DISKS IN EACH DISK SET

| ADDRESS DIGITS | 7 | 6 | 5 | 4 3 | 2 1 |
|---|---|---|---|---|---|
| DECODING FORMAT | DFEU NUMBER<br>0-9 | NOT USED | DISK SET<br>0-9 | TRACK NO.<br>0-99<br>(0-49-DISK 1)<br>(50-99-DISK 2) | SEGMENT NO.<br>0-99<br>0-49-LEFT FACE<br>50-99-RIGHT FACE |

240 CHARACTER SEGMENT
10,000 SEG. / DISK
1 DISK IN EACH DISK SET

| ADDRESS DIGITS | 7 | 6 5 | 4 3 | 2 1 |
|---|---|---|---|---|
| DECODING FORMAT | DFEU NUMBER<br>0-9 | DISK<br>0-19 | TRACK NO.<br>0-99<br>(0-49-L. FACE)<br>(50-99-R. FACE) | SEGMENT NO.<br>0-99 |

96 CHARACTER SEGMENT
25000 SEG. / DISK
4 DISKS IN EACH DISK SET

| ADDRESS DIGITS | 7 | 6 | 5 4 | 3 2 1 |
|---|---|---|---|---|
| DECODING FORMAT | DFEU NUMBER<br>0-9 | DISK SET<br>0-4 | TRACK NO.<br>0-99<br>0-49-DISK 1 & 2<br>50-99 DISK 3 & 4 | SEGMENT NO.<br>(0-249 DISK 1, L. FACE)<br>(250-499 DISK 1, R. FACE)<br>(500-749 DISK 2, L. FACE)<br>(750-999 DISK 2, R. FACE) |

FIG. 2A

INVENTORS.
ERWIN A. HAUCK
JAMES E. WOLLUM
BY
Christie, Parker & Hale
ATTORNEYS.

3,340,512
Patented Sept. 5, 1967

3,340,512

STORAGE-PATTERN INDICATING AND DECODING SYSTEM

Erwin A. Hauck, Arcadia, and James E. Wollum, Duarte, Calif., assignors to Burroughs Corporation, Detroit, Mich., a corporation of Michigan Filed July 20, 1964, Ser. No. 383,586
9 Claims. (Cl. 340—172.5)

ABSTRACT OF THE DISCLOSURE

An addressing system is disclosed wherein various groups of disk file memory units are provided with information patterns, or formats, which are distinct from each other so as to meet various customer requirements. The total information content of all disks, regardless of their information format, remains substantially constant; however, different formats result in a different physical location for any given address as supplied to a control unit by a programmer. On occasion one, or more, groups of disk file memory units formatted in a particular information format must be replaced by a replacement unit which has a different information format. This possibility and the normal operating conditions wherein a large number of such disk file units may be controlled by a common control unit, requires the programmer to known in advance what information format exists at a unit he is designating. In accordance with the disclosure of this invention, this burdensome task is avoided in that an interrogate signal from the control unit is sent out to a disk file unit to be addressed. Every disk file unit is equipped with an information format indicating circuit for emitting an information format indicating signal and means to apply this format indicating signal back to the control unit. Associated with each particular format in the control unit is a decoding matrix which, when connected to the storage register for the address to be sent out, will decode the address in accordance with the format which exists in the unit that is being interrogated. The information format indicating signal which has been returned by a unit which has been interrogated, connects the correspondingly associated matrix to the address storage register so that the address is decoded in accordance with the format at the interrogated unit.

This invention relates in general to information addressing systems, and more particularly to an addressing system which initially designates one of a plurality of units having different storage patterns therein and thereafter decodes an address signal in accordance with a pattern-indicating signal which is returned from the designated unit.

While not limited thereto, this invention finds special application in a magnetic memory system such as those employing interlaced information words stored on magnetic disks. An information address recording and retrieval system utilizing numerous magnetic memory disks having such interlaced word format is described in a patent application by A. R. Gleim et al., Ser. No. 306,365, filed Sept. 3, 1963, and assigned to the same assignee as the present application. Reference to the foregoing application may be had if the details of the word interlace format is desired. Briefly, however, words having a predetermined number of serial bits i.e., binary "zeros" or "ones" from two different records, or histories, are alternated in an interlaced fashion in one pie-shaped segment of a memory disk. Each word in the segment comprises a number of characters that are formed by equal-numbered bit groups. The invention described in the foregoing application describes a system which may advantageously be calibrated to include in each segment two records having twelve, fifty-six bit words each having eight different six-bit alphanumeric characters, and further including one, six-bit check character and two extra spacer bits. This calibration of the memory disk is referred to as a 96-character segment, or 96 CS, because twelve words of one record includes ninety-six alphanumeric characters. As explained in the foregoing application, although this 96 CS format is satisfactory for a large percentage of computing operations, the magnetic memory disks are not limited to such a format, and in fact several different information pattern formats are available.

These different information storage formats are highly desirable in order to accommodate divergent customer uses which entail different organizations for their particular information handling requirements. For example, some customer uses include records which are to be stored on the disks, and which have an information content that can best be handled by a number of characters per segment greater than the above mentioned 96 CS information format. Of course, all disk file sides contain the same number of information bits, but by including a different number of characters within any one record, then the information content for that record can be increased. An increased number of characters per segment, of course, decreases the number of segments per disk; and this in turn requires different addressing techniques.

Accordingly, any one disk file memory system to satisfy the customer's requirements, may have several different formats for storage of that customer's information. These different customer's options create a complex addressing problem because any single address will, according to the character pattern or information format in question, indicate different physical locations in the memory disks.

One manner known to the prior art by which this problem may be overcome is to provide individual distinct designations for addresses for every segment in all the total number of disks irrespective of the information format. Such an approach however, increases the number of addressing digits, and requires a complex addressing scheme which makes the unit difficult to program. In this prior art approach any program requires knowledge of the physical location of the stored items, and thus is undesirable for a great variety of applications.

Furthermore, this prior art approach decreases the compatibility of the system with numerous other computer systems. In order for a bulk disk file to be a true accessory unit, the addressing system must be simple and contain as few addressing characters as possible in order to be compatible with many different computer systems.

The addressing system of this invention overcomes the above-mentioned disadvantages of the prior art, and provides a simple addressing operation which is compatible with most computers, and allows a programmer complete freedom to write storage and retrieval programs without any consideration of the physical location of such information.

In the addressing system of this invention, the programmer need only associate his information with a particular address signal and a designated electronics unit. The address signal actually designates different locations for each of the customer's options, but the addressing system of this invention assures correct storage and retrieval without any further knowledge on the programmer's part. The disk file system addressing circuit of this invention includes an address register in a common control for storing this single address signal which identifies several different locations in several units, each of which may have information patterns different from other units. Only one of these various locations is a desired location, and this desired location is automatically selected by employing an address decoding matrix which is connected to the storage unit and which includes different operating modes for decoding the address signal in a manner consistent with the information pattern of a selected storage unit. A plurality of gating means, each of which are individually associated with a different storage unit pattern are connected between this address register and the decoding matrix. The common control applies a designating or interrogate signal to one of these storage units which in turn responds to this interrogating signal by automatically returning to the control another signal which indicates the information pattern that is stored therein. Circuit means in the common control are responsive to this pattern identifying signal for enabling the proper gating means and thus assuring that an operational mode in the matrix decodes the address signal properly for the selected storage unit.

The invention is described in more detail by reference to the accompanying drawing in which:

FIG. 2A is a group of charts showing different information formats for the memories of FIG. 1.

Figure 1:
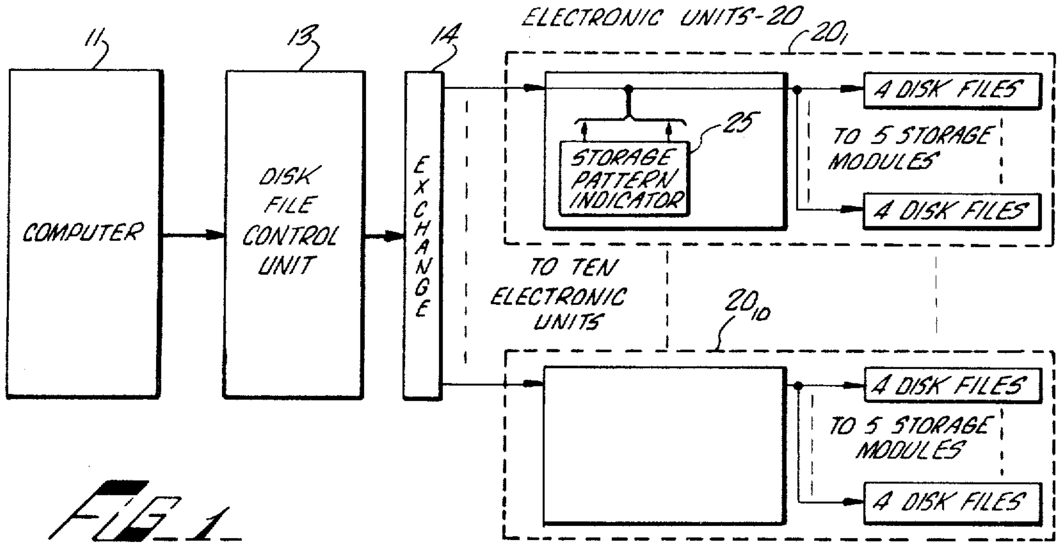
FIG. 1 is a block diagram of a disk file system capable of employing the principles of this invention.

Referring now to FIG. 1, the system is shown including a computer 11 as a processing device operative for providing storable and recoverable information in a disk file memory system. Information from the computer is received by a common control 13 of the disk file system and is gated through an exchange 14 for storage in one of a plurality of electronic units 20. Each one of these electronic units contains logic circuitry that is controlled by the common control 13 and exchange 14, and is operative for selecting a designated storage location from among numerous storage locations in the memory disks. By way of example, each one of the ten electronic units $\mathbf{20}_1$ through $\mathbf{20}_{10}$ of FIG. 1, have associated therewith five storage modules having four disk memories per module. Further, by way of example, and not to be taken as limiting, it is assumed that all twenty disk memories for each one of the electronic units contain the same information format. Different electronic units however, have different information formats. These formats will be discussed in greater detail hereinafter, but suffice to say at this point that a storage pattern or format, indicator circuit 25 is included in each of the electronic units, and is operative in response to an initial selection, or designating signal from the common control 13 for returning a signal indicative of that particular unit's information format. When this information format indicating signal is received by the disk file common control 13, address decoding proceeds in an operational mode matched to that electronic unit's information pattern in order to automatically obtain the proper physical location for the information in question.

Figure 2B:
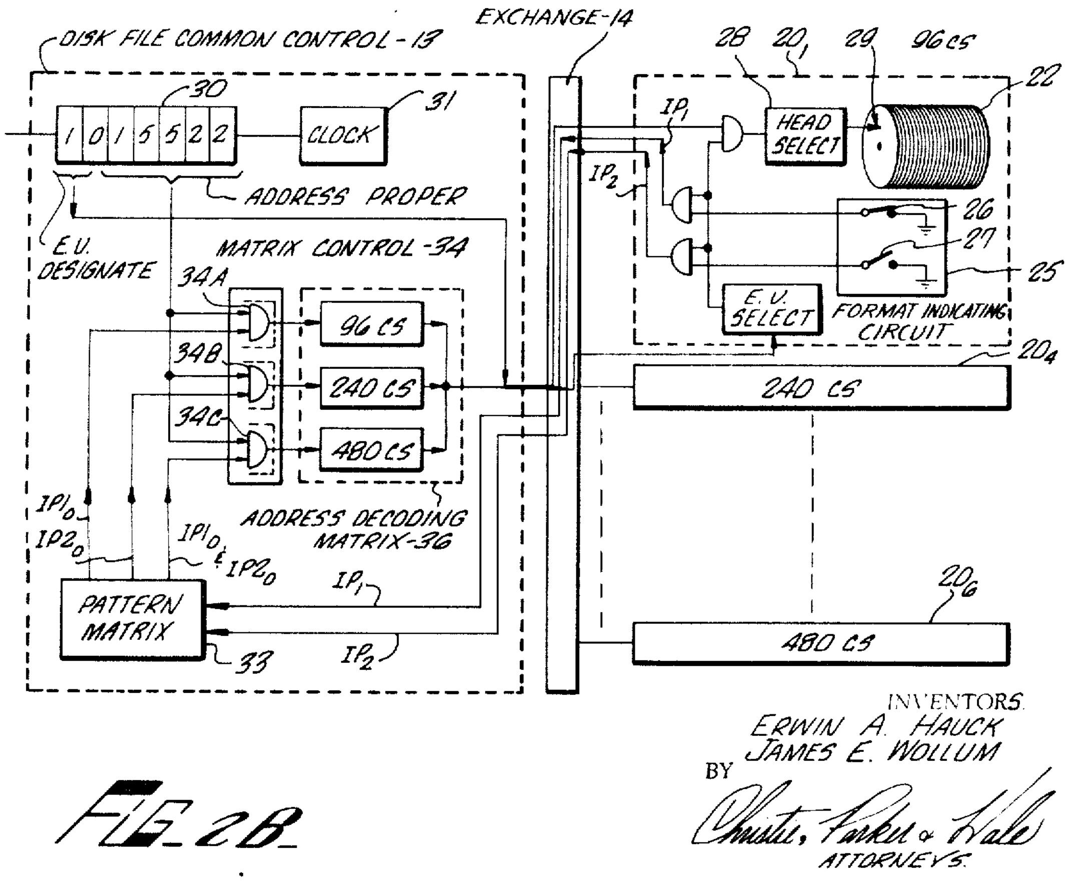
FIG. 2B is a combined circuit schematic and block diagram of the automatic addressing circuit for the system of FIG. 1, embodying the principles of this invention.

Reference to FIG. 2A, shows charts containing the various information address formats for the 96, 240 and 480 character segment customer options. As discussed hereinbefore one record in a 96 CS format includes 96 characters while in a similar manner, one record in a 240 CS format includes 240 characters and one record in a 480 CS format includes 480 characters. The manner of addressing a disk file memory, and this information format are discussed in greater detail in an article entitled "Engineering Description of the Burroughs Disk File" in the the A.F.I.P.S-F.J.C.C. proceedings volume 24, November 1963, pages 340 through 350, and reference may be made thereto for a detailed discussion. Briefly however, the first horizontal row in each chart shows the number of the address digits. The six least significant decimal-coded digits of an address contain the address proper which is stored in the address register 30 of FIG. 2B, and define the actual physical location of one segment of one track on one side of one disk. This particular disk is associated with one electronics unit as determined by the seventh and most significant digit of the address which also is stored in register 30 of FIG. 2B.

As shown by the top chart in FIG. 2A, the information format which provides 480 character segments has the most characters per segment and thus the least number of segments for each disk. The information format providing 96 characters per segment on the other hand has the least number of characters per segment and the most segments per disk, while the 240 character information format is intermediate these extremes.

It is because of the different character segment options that one address word will define three different locations in memories formatted according to the three different customer options. The address word number 1015522 is chosen for illustrative purposes, and is shown stored in the address register 30 of FIG. 2B. In both the 240 and 480 CS options the two least significant digits 22 define segment number 22, whereas in the 96 character the three least significant digits define the segment number 522. The track number and the disk number for each of the options also differs in the manner illustrated in the charts of FIG. 2A, and discussed hereinafter.

Application of these charts will show that if the first disk file electronic unit, which is designated by the most significant digit 1, is calibrated in the 480 character option, then the address stored in address register 30 of FIG. 2B, will have a physical location of the 22nd segment of the 55th track on the left face of the second disk in the second set of ten disk sets, each set of which has two disks. If merely for sake of example, the left-hand portion of the disk group 22 of electronic unit $\mathbf{20}_1$ in FIG. 2B, is chosen as a starting point, then the address 1015522 has defined one unique spot on the fourth disk from the left. On the other hand, if the second electronics unit is calibrated in the 240 character option, then that same address defines the 22nd segment of the 55th track on the right face of the second disk, which of course is a different physical location because, referring to FIG. 2B again, this is the second disk from the left.

Finally, if the second electronics unit is calibrated in the 96 character option, then the address in question defines the 522nd segment which is located on the left face at track 15 of disk 2 of the first disk set. This disk is the second disk from the left as shown in disk group 22 of FIG. 2B, and is a different location from either of the other options just discussed.

As discussed in the foregoing, one address proper would define different locations according to the calibration for an electronic unit. The operation by which the addressing circuit of this invention automatically determines the information format at a selected storage unit and proceeds through a decoding operation appropriate for that address is discussed hereinafter by reference to FIG. 2B.

FIG. 2B, shows the disk file common control 13 and one of the electronic units $\mathbf{20}_1$ in greater detail. In the foregoing discussion it was noted by way of example only, that all memory disks for one electronics unit have the same information format, and accordingly electronic unit $\mathbf{20}_1$ shows the twenty memory disks 22 grouped together therein. These disks may advantageously each include 96 characters per segment. Similarly, even though not shown, the electronic units $\mathbf{20}_4$ and $\mathbf{20}_6$ each include twenty memory disks having different information formats. For example, electronic unit $\mathbf{20}_4$ has a 240 character segment option, and electronic unit $\mathbf{20}_6$ has the information on its memory disks formatted to contain 480 characters per segment.

The disk file common control 13 of FIG. 2B, includes an address register 30 for storing an address proper and an electronic unit designating digit. Information signals representing binary coded decimal digits from computer 11 in FIG. 1, are stored in register 30. This register is controlled by timing source 31 which may be any timing source standard in the art, so that the electronic unit designate digit is gated out first and applied through exchange 14 to select one of the electronic units 20.

As mentioned hereinbefore, the selected electronics units although not limited thereto, may advantageously have in the embodiment shown in FIG. 2B, either 96, 240 or 480 characters per segment as an information format for their memory disks. In order to accommodate these different segment sizes, an information format indicator circuit 25 may take various forms, the simplest of which is shown in FIG. 2B, as two grounded terminals and associated switches 26 and 27 for generating a binarily encoded output on information pattern leads $IP_1$, and $IP_2$. The binary outputs from indicator circuit 25 of electronic unit 20 are chosen to reflect the segment format of the memory disks for that unit. For example, unit $\mathbf{20_1}$ has memory disks calibrated in a pattern of 96 characters per segment which pattern is represented by the depicted condition of switches 26 and 27. Each of the remaining electronic units of a different character format would also have an indicator circuit 25 in which the switches thereof would be closed in a manner different from that shown for unit $\mathbf{20_1}$. Whereas unit $\mathbf{20_1}$ has switch 26 closed and switch 27 open, unit $\mathbf{20_4}$ may advantageously have switch 26 open and 27 closed; and unit $\mathbf{20_6}$ may advantageously have both switches 26 and 27 closed.

With respect to electronic unit $\mathbf{20_1}$ and the closed switch 26 of indicator circuit 25, a grounded signal is generated on indicator pattern lead $IP_1$, which lead and lead $IP_2$, are connected to the pattern matrix 33 in the common control.

Pattern matrix 33 of FIG. 2B, is any prior art 2 x 3 matrix which translates the grounded input signals as presented by $IP_1$ and $IP_2$, and applies an appropriate enabling signal to the matrix control circuit 34. This matrix control circuit 34 contains logic circuitry which is available in the prior art, and is adapted to reflect the address word as a series of signal levels. These signal levels in turn bias an appropriate array of input diodes in a well known manner to provide different operating modes in the standard diode addres decoding matrix 36. This control circuit 34 is shown having gating means comprising AND gates 34A, 34B, and 34C. Actually, more than one logic gate is required to properly gate the digits of the address from register 30 to matrix 36, and the dashed lines indicate that other gates are present. These gating techniques are standard in the art and need not be described in detail.

The address proper is gated through the appropriate portion of the address decoding matrix 36, when timing clock 31 reads out the six digit levels from register 30, and pattern matrix 33 applies an enabling signal on $IP1_0$ coincident with this read out operation. These signals from matrix control gate 34A are decoded by the appropriate 96 CS matrix array. Having decoded the address from register 30 the appropriate part of the decoding matrix 36 applies an output to electronics unit $\mathbf{20_1}$ which output controls a head select circuit 28. Although only one information head 29 is shown for the unit $\mathbf{20_1}$, it should be understood that there is a head for each track on each disk face and the head select circuit 28 is responsive to the output from the decoding matrix 36 for selecting the one addressed head in any manner well known in the art.

Thus, the address location described hereinbefore on the second disk from the left of disk group 22 is made available for information storage and retrieval. This storage and retrieval operation is described and claimed in the aforementioned Gleim et al., patent application.

If the information in the disk group 22 of electronics unit $\mathbf{20_1}$ is transferred to another electronic unit replacement which is calibrated in one or the other information formats, the addressing circuit of this invention would still receive and store the same address word in register 30 of common control 13, but would decode it according to the substituted information format. For example, if the substituted electronics unit $\mathbf{20_1}$ is calibrated in 240 CS information format then pattern indicator 25 would generate a ground signal on the appropriate $IP_2$ lead connected between pattern indicator circuit 25 and pattern matrix 33. Thereafter lead $IP2_0$ would direct an enabling signal to AND gate 34B of matrix control 34, and the address decoding operation for the 240 CS format would follow.

In accordance with the foregoing, the novel addressing circuit techniques of this invention are simple, efficient, and afford great compatibility with many information processing units, and at the same time, are amenable to easy programming. It should be understood that the information formats which provide these customer options for the disk file system accessory unit are merely illustrative of the adaptability of the principles of this invention. Numerous other circuit arrangements and information formats may be devised by those skilled in the art without departing from the spirit and scope of this invention.

What is claimed is:

1. An addressing circuit for a disk file system comprising a plurality of storage units each having disk memory stores formatted in at least two distinct storage unit information patterns, a control unit in common to the plurality of storage units, an address register in the control unit for storing an address which identifies several different physical locations in the storage units having different information patterns therein and only one of which is a desired location, an address decoding matrix in said control unit and connected to said storage units for decoding the address signal in a manner appropriate for each of the individual information patterns of said storage units, a plurality of gating means in said control unit individually associated with the distinct information patterns at said storage units and connected between said address register and said address decoding matrix, means at said control unit and individually connected to each storage unit for applying a designating signal from said control unit to one of said storage units, means at said one storage unit responsive to said designating signal for returning to said control unit a signal indicative of the information pattern stored therein, and means at said control unit responsive to said pattern identifying signal for enabling individual gating means from said plurality of gating means which are associated with the information pattern at said one storage unit.

2. In a disk file system comprising a control unit, means in said control unit for storing a single address which identifies different physical locations in a plurality of memory files which have different information patterns, address decoding means controllable for decoding the address signal in a different manner for each information pattern in said memory files, means for delivering a memory file interrogating signal from said control unit to one of said plurality of memory files, individual means at each one of said memory files responsive to receipt of said interrogating signal thereat for returning to said control unit a signal indicating the information pattern stored at the memory file which was interrogated, and means at said control unit connected between said address storing means and said address decoding means and responsive to said information pattern indicating signal for controlling the address decoding operation in said decoding means in accordance with the information pattern in the memory file which returned the information pattern indicating signal to the control unit.

3. An addressing system comprising a control unit common to a plurality of memory storage devices having predetermined designations and different information patterns therein, means in said common control unit for storing and address signal and a storage device selecting signal identifying the designation of one of said memory storage devices, decoding means connected to said address storing means and controllably operative for delivering to said memory storage devices a decoded address in accordance with the different information patterns thereof, signal applying means individual for each one of said memory storage devices and connected to said means for storing the storage device select signal for applying the storage device select signal to a predetermined one of the memory storage devices designated thereby, and means at the predetermined designated memory storage device responsive to said select signal applied by said signal applying means and connected to said control unit for controllably operating said address decoding means in accordance with the information pattern in said predetermined designated memory storage device.

4. In a disk file system comprising a control unit, means in said control unit for storing an address signal which identifies unique physical locations on disk file memories dependent upon the information format employed from among a plurality of available information formats for said disk file memories, a plurality of matrices in said control unit equal to the available number of formats in said disk file system for decoding the stored address signal according to any one of the available formats, a plurality of storage modules each including at least one disk file memory and each having all memory disks of one module assigned the same information format selected from said plurality of information formats, means in said control unit independent of said matrices for delivering a select signal to one of said plurality of storage modules, means at said one storage module and responsive to said select signal for returning to said control unit a format indicating signal, and means responsive to said returned format indicating signal for completing a circuit between said address storing means and said matrix assigned the same format as the format of the selected storage module.

5. An addressing system in accordance with claim 3 wherein said means at said designated memory storage device for controllably operating said address decoding means in said common control unit comprises a pair of pattern indicating leads and switch means connected between each lead and a point of common potential for applying a binary signal to said pair of leads which binary signal is indicative of the information pattern of said designated memory storage device.

6. An addressing system in accordance with claim 5 and further comprising a plurality of gating means connected between said address storing means and said address decoding means, and a binary signal translating device in said common control unit connected to said pair of pattern indicating leads and responsive to said binary encoded signal thereat for applying an enabling signal to selected ones of said plurality of gating means.

7. An addressing system in accordance with claim 6 and further comprising a clock source connected to said address storing means and operative for causing said address storing means to read out said storage device selecting signal, and thereafter to read out said address signal following the enablement of said selected ones of said plurality of gating means.

8. An addressing system for a disk file memory comprising a plurality of storage modules each having disk memory stores formatted in either a first, second, or third information pattern; a control unit connected in common to said storage modules; an address register in said control unit for storing a single address signal which identifies different physical locations on said disk memory stores for each one of said information patterns, and for storing a designating signal which identifies different ones of said plurality of storage modules; a first, second, and third decoding matrix each associated with one of said information patterns for decoding said address signal in accordance with the format thereof; a plurality of gating means connected between said address register and said decoding matrices, said gating means being arranged in first, second, and third groups individually associated with said decoding matrices for gating said address signal to a selected one of said matrices; first connecting means independent of said matrices and connected between said address register and said storage modules; clock means connected to said register for causing said register to deliver said designating signal via said first connecting means to a designated one of said storage modules; means at said designated storage module for generating a signal indicative of the information pattern therein; second connecting means connected between said signal generating means and said control unit for returning to said control unit a signal indicative of the information pattern of said designated storage module; and means at said control unit connected between said gating means and said second connecting means for enabling the one group of said plurality of gating means individually associated with the matrix which has the same format as said designated storage module.

9. An addressing system in accordance with claim 8 wherein said pattern indicating signal generating means comprises a pair of leads and a pair of grounded switches selectively connected to said pair of leads for generating a predetermined binary encoded signal, and wherein said means at said control unit connected to said second connected means comprises a translating device responsive to said binary encoded signal for applying an enabling signal only to said one group of said plurality of gating means.

References Cited

UNITED STATES PATENTS

| | | | |
|---|---|---|---|
| 3,008,127 | 11/1961 | Bloch et al. | 340—172.5 |
| 3,141,151 | 7/1964 | Gilson | 340—174.1 |
| 3,208,057 | 9/1965 | Applequist et al. | 340—174.1 |
| 3,230,509 | 1/1966 | Spencer | 340—172.5 |
| 3,251,037 | 5/1966 | Coil et al. | 340—172.5 |

OTHER REFERENCES

Walton, C. A.: General Purpose Process Control Computer System in IBM Tech. Discl. Bull., pages 52–53, October 1962.

Hedrick, G. B., et al.: Precision Mode Bit, in IBM Tech. Discl. Bull., pages 43–45, August 1961.

Lindaner, S. L., et al.: Instruction Unit, in IBM Tech. Discl. Bull., pages 72–74, June 1964.

PAUL J. HENON, *Primary Examiner.*

ROBERT C. BAILEY, J. P. VANDENBURG, *Assistant Examiners.*

UNITED STATES PATENT OFFICE

CERTIFICATE OF CORRECTION

Patent No. 3,340,512 September 5, 1967

Erwin A. Hauck et al.

It is hereby certified that error appears in the above numbered patent requiring correction and that the said Letters Patent should read as corrected below.

Column 2, line 29, after "disk" insert -- side --; line 40, for "for", first occurrence, read -- or --; column 3, line 71, strike out "the", first occurrence; column 4, line 23, after "character" insert -- option --; column 5, line 13, after "25" insert -- is provided for each of the various electronic units. This indicator circuit 25 --; line 45, for "addres" read -- address --; column 7, line 2, for "and", first occurrence, read -- an --.

Signed and sealed this 26th day of November 1968.

(SEAL)

Attest:

Edward M. Fletcher, Jr.
Attesting Officer

EDWARD J. BRENNER
Commissioner of Patents